(12) United States Patent
Takasugi et al.

(10) Patent No.: US 6,733,544 B2
(45) Date of Patent: May 11, 2004

(54) METHOD OF PRODUCING ELECTRICAL DOUBLE LAYER CAPACITOR AND METHOD OF MOUNTING ELECTRICAL DOUBLE LAYER CAPACITOR ON A CIRCUIT SUBSTRATE

(75) Inventors: Shinichi Takasugi, Sendai (JP); Yoshimi Kanno, Sendai (JP); Shunji Watanabe, Sendai (JP); Tsugio Sakai, Sendai (JP); Yoshibumi Nakamura, Sendai (JP); Hideharu Onodera, Sendai (JP)

(73) Assignee: SII Micro Parts Ltd., Miyagi (JP)

( * ) Notice: Subject to any disclaimer, the term of this patent is extended or adjusted under 35 U.S.C. 154(b) by 0 days.

(21) Appl. No.: 09/975,194

(22) Filed: Oct. 10, 2001

(65) Prior Publication Data
US 2003/0007316 A1 Jan. 9, 2003

(30) Foreign Application Priority Data
Oct. 11, 2000 (JP) .......................... 2000-310322
Jul. 13, 2001 (JP) .......................... 2001-214054

(51) Int. Cl.$^7$ .......................... H01G 9/00; H01G 9/02
(52) U.S. Cl. .................. 29/25.03; 361/502; 361/505; 361/520
(58) Field of Search .............. 29/25.01; 361/500, 361/502, 503–505, 517, 520

(56) References Cited

U.S. PATENT DOCUMENTS

| 5,360,685 A | * | 11/1994 | Tanaka |
| 6,130,311 A | * | 10/2000 | Kurz et al. |
| 6,152,970 A | * | 11/2000 | Wei et al. |
| 6,274,277 B1 | * | 8/2001 | Mori et al. |
| 6,489,062 B1 | * | 12/2002 | Watanabe et al. |

* cited by examiner

Primary Examiner—Ha Tran Nguyen
(74) Attorney, Agent, or Firm—Adams & Wilks

(57) ABSTRACT

A method for producing an electrical double layer capacitor comprising the steps of assembling together components comprised of a positive electrode, a negative electrode, a non-aqueous solvent, an electrolyte containing a supporting salt, a separator, and a gasket to form a coin- or button-type electrical double layer capacitor, heating the assembled coin- or button-type electrical double layer capacitor so that a temperature profile of the heating step is approximately the same as a temperature profile of reflow soldering, and welding an outer connection terminal to the heated assembled coin- or button-type electrical double layer capacitor after the heating step.

13 Claims, 2 Drawing Sheets

METHOD OF PRODUCING ELECTRICAL DOUBLE LAYER CAPACITOR AND METHOD OF MOUNTING ELECTRICAL DOUBLE LAYER CAPACITOR ON A CIRCUIT SUBSTRATE

BACKGROUND OF THE INVENTION

1. Technical Field of the Invention

The present invention relates to coin (button)-type electric double layer capacitors utilizing a lithium ion-conductive non-aqueous electrolyte and comprising a substance capable of occluding and discharging lithium, metallic lithium, or an alloy thereof as a negative active material, and a substance capable of occluding and discharging lithium as the positive active material. The present invention also relates to an electric double layer capacitor mountable by reflow a soldering and to a method of producing the same.

2. Prior Art

Because coin (button)-type electric double layer capacitors are lightweight and are capable of yielding high energy density, their application to back-up power sources of electric appliances has been increasing.

In case of using the capacitor above mainly as the memory back-up power source, in general, a terminal for use in soldering is welded to the capacitor, and the capacitor is then mounted on a printed circuit board together with a memory device by soldering. Conventionally, soldering to the printed circuit board had been realized by using a solder iron, however, with the recent demand on miniaturized devices or on devices with higher function, there is a requirement to increase the number of electronic components to be mounted in a same area of a printed circuit board. Accordingly, more difficulties are found to obtain a space for inserting the solder iron. Furthermore, to reduce the cost, automated soldering operation is required.

Thus, recently employed are a method comprising mounting the components on the printed circuit board the portions of which are previously coated with a solder cream and the like, or a method comprising mounting the components and then supplying small solder balls thereto. In both methods, the printed board having the components mounted thereon is passed through a heating furnace provided with a high temperature atmosphere set at a temperature not lower than the melting point of the solder, for instance, in a temperature range of from 200 to 260° C., such that the solder may be molten to effect the soldering (this method is referred to hereinafter as "reflow soldering").

3. Problems that the Invention is to Solve

A coin (button)-type electric double layer capacitor mountable by reflow soldering utilizes an organic solvent for the electrolyte, a metallic oxide for the positive electrode, and a negative electrode having added thereto lithium in some form during the production process to provide the active material. In such a capacitor, the constituents incorporated therein are active by nature of the capacitor itself. Accordingly, if the quantity ratio of the constituents should change depending on the fluctuation in the production process, such a change could cause bulging, liquid leakage (i.e., leaking of the electrolyte to the outside of the capacitor), etc., during the reflow soldering utilized in mounting the capacitor to the product board.

Furthermore, an electric double layer capacitor mountable by reflow soldering must assure the capacitor performance after reflow soldering. However, there are some cases in which the capacitor contains somewhat large amount of foreign matter (i.e., water, etc.). The capacitor characteristics are not influenced at the room temperature, but after reflow soldering or after storage, a sudden deterioration in capacitor characteristics was sometimes found to occur in such cases.

SUMMARY OF THE INVENTION

As a means of overcoming the aforementioned problems, the present invention according to a first aspect provides, in a method for producing an electric double layer capacitor comprising a positive electrode, a negative electrode, a non-aqueous solvent, an electrolyte containing a supporting salt, a separator, and a gasket, a method comprising: a step of assembling by caulk sealing inside an electric double layer capacitor said positive electrode, said negative electrode, said non-aqueous solvent, said electrolyte, said separator, and said gasket; and a heating step. In this aspect, an outer connection terminal may be welded after the heating. The heating temperature can be set in a range of from 180 to 300°C. However, the upper limit of the temperature must be set at a temperature not higher than the melting point of the material constituting the gasket used in the product.

In accordance with a second aspect of the present invention, there is provided, in a mounting method comprising arranging an electric double layer capacitor on a circuit substrate, a mounting method which comprises a step of assembling by caulk sealing inside an inner electric double layer capacitor said positive electrode, said negative electrode, said non-aqueous solvent, said electrolyte, said separator, and said gasket; a heating step; and a step of arranging and reflow soldering said electric double layer capacitor on said circuit substrate. In this case, an outer connection terminal may be welded after the assemblage. Furthermore, preferably, in the heating region of from 0 to 150° C., the difference between the temperature profile with respect to time during said heating step and the temperature profile with respect to time during said reflow soldering falls within ±50%.

Also preferably, in the heating region of from 0 to 150°C., the difference in time duration between the time of said heating step and the time of said reflow soldering falls within It is also preferred that, in the heating region of from 150 to 180° C., the difference between the temperature profile with respect to time during said heating step and the temperature profile with respect to time during said reflow soldering falls within ±20%.

Further preferably, in the heating region of from 150 to 180° C., the difference in time duration between the time of said heating step and the time of said reflow soldering falls within ±20%.

Also preferably, in the heating region of from 180 to 300° C., the difference between the temperature profile with respect to time during said heating step and the temperature profile with respect to time during said reflow soldering falls within ±10%.

It is also preferred that, in the heating region of from 180 to 300° C., the difference in time duration between the time of said heating step and the time of said reflow soldering falls within ±10%.

In accordance with another aspect of the present invention, there is used a sealing material for an electric double layer capacitor comprising a rubber based adhesive provided with asphalt on the surface thereof. Preferably, the sealing material is provided on the surface of said rubber based adhesive in a plurality of spots set apart from each other.

Also preferably, said asphalt is a fraction obtained by heating crude oil. Furthermore, it is preferred that the rubber based adhesive contains asphalt inside thereof.

Further preferably, the asphalt accounts for 1% or more but not more than 50% of said rubber based adhesive. More preferably, the asphalt accounts for 5% or more but not more than 20% of said rubber based adhesive.

It is also preferred that the asphalt is a blown asphalt or a straight asphalt.

Suitably used as the rubber based adhesive is such based on butyl rubber.

According to a still other aspect according to the present invention, there is used a sealing material for an electric double layer capacitor obtained by mixing asphalt with a rubber based adhesive and by then heating the resulting mixture.

Furthermore according to another aspect of the present invention, there is employed a method for producing a sealing material for an electric double layer capacitor, which comprises mixing asphalt with a rubber based adhesive, and by then heating the resulting product. Preferably, rubber based adhesive is based on butyl rubber. Furthermore, the mixing is carried out in an organic solvent. It is further preferred that the organic solvent is toluene.

In accordance with an aspect of the present invention, there is provided a method for producing an electric double layer capacitor, which comprises: a step of assembling by caulk sealing inside an electric double layer capacitor a positive electrode, a negative electrode, a non-aqueous solvent, an electrolyte, a separator, and a gasket, comprising dissolving a rubber based adhesive and an asphalt in an organic solvent, applying the resulting product to the inner plane of a positive electrode canister and the plane in contact with the negative electrode of the gasket, and drying the coated product; and a heating step. In this case, the asphalt used is straight asphalt. Furthermore, the drying temperature is preferably, 80° C. or higher.

Also usable as the asphalt is blown asphalt. In this case, the drying temperature is preferably, 100° C. or higher.

Further, by forming a mark showing the heating treatment on the face of the capacitor canister, distinguishable are a final molded product and an intermediate product.

In a still other aspect of the present invention, there is provided, in an electric double layer capacitor comprising a positive electrode, a negative electrode, a non-aqueous solvent, an electrolyte containing a supporting salt, a separator, a gasket, and an external connection terminal, an electric double layer capacitor comprising a mark showing that the product is once heated during its production process.

According to a yet other aspect of the present invention, there is provided an electric double layer capacitor comprising a positive electrode, a negative electrode, a non-aqueous solvent, an electrolyte containing a supporting salt, a separator, and a gasket, which is heated to substantially the temperature of reflow treatment.

In order to achieve the aforementioned objects in the present invention, in the production of a reflow-soldering mountable electric double layer capacitor, the capacitor was subjected to a heat treatment following a temperature profile resembling to the temperature profile with respect to time employed in the reflow soldering step after assembling the electric double layer capacitor. Then, the capacitor characteristics and the appearance were inspected, and those having no anomalies in quality were marked with the product serial number and a symbol of "H" to show that the product was subjected to heat treatment. A terminal was welded to the product thereafter.

Although the heat treatment is effective after welding the terminal, considerations should be made on the adhesion to the vessel with heating in case solder plated terminals are used.

DETAILED DESCRIPTION OF THE PREFERRED EMBODIMENT

Figure 1:
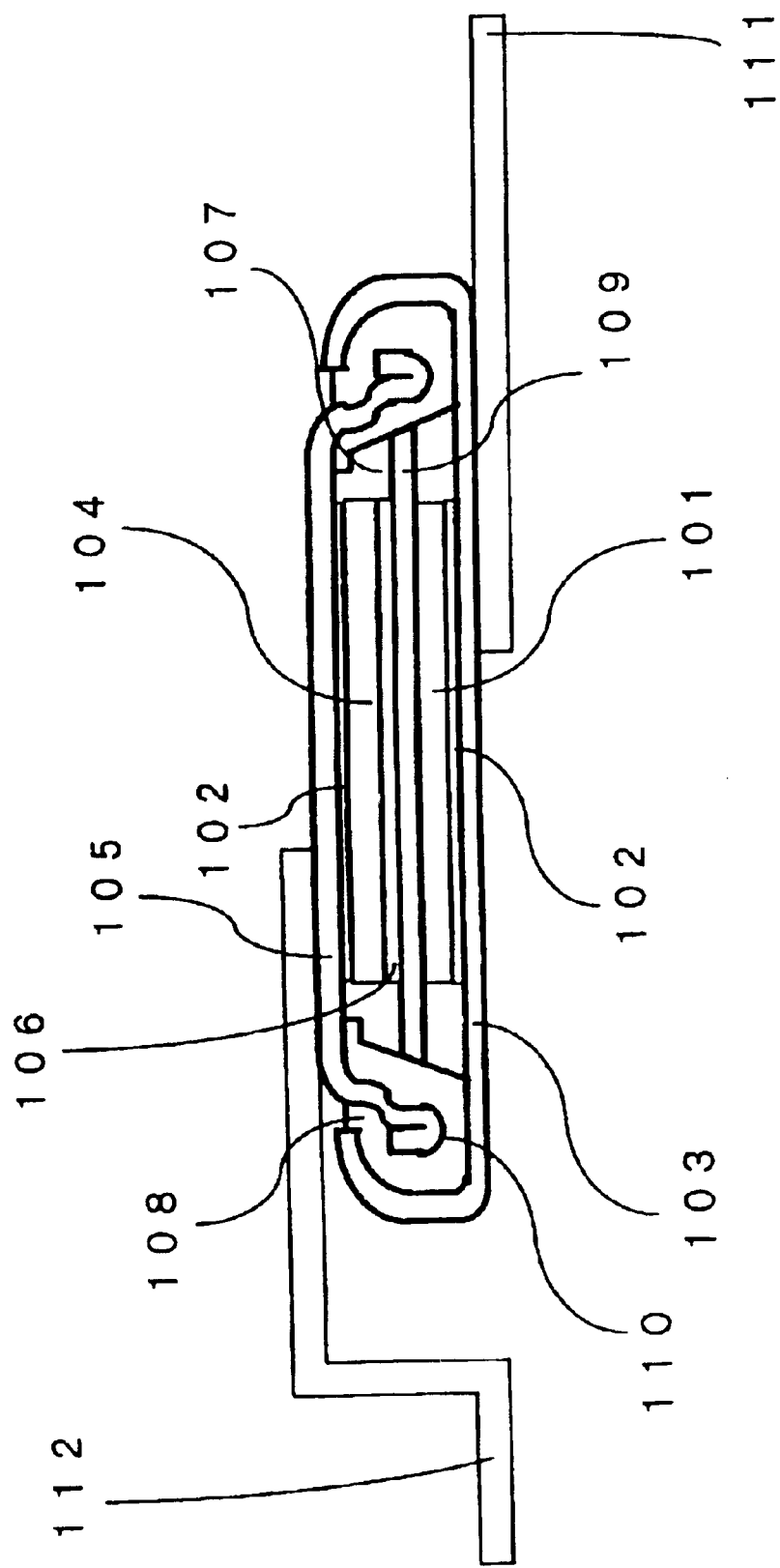
FIG. 1 is a cross section view of an electric double layer capacitor mountable by reflow soldering according to the present invention.

In an electric double layer capacitor mountable by reflow soldering heretofore produced, if foreign matter (e.g., water, etc.) were to be incorporated into the cell during its production process, or if the electrolyte were to be injected in an excessive quantity, the resulting capacitor sometimes suffered bulging, liquid leakage (i.e., leaking of the electrolyte to the outside of the capacitor), or, in worst case, explosion, during the reflow soldering utilized in mounting the capacitor to the product board. In most of the cases in which bulging occurred to the cell during reflow soldering, although depending on the structure of the terminal, one of the terminals is released from the substrate. Thus, such a product no longer functions as a capacitor because electric conduction cannot be established. Since the electrolyte discharged out to the capacitor due to leakage contains a supporting salt, it affects together with water to cause corrosion of the circuit of the substrate. An explosion may cause damage to the substrate or to the other electronic components. Hence, the product to be mounted with the capacitor suffers great loss. In order to prevent such damages from occurring, the fluctuation during production should be suppressed to the limit, and this requires a large increase in production cost. For instance, to increase the precision in injecting the electrolyte, an expensive electrolyte injection machine must be introduced. Still, however, there was no assurance for completely preventing bulging, liquid leakage, or explosion from taking place.

Furthermore, an electric double layer capacitor mountable by reflow soldering must have its capacitor performance assured even after it is subjected to reflow soldering. However, there are sometimes cases in which the capacitor takes up foreign matters (i.e., water, etc.) due to a fluctuation in production. The capacitor characteristics are not influenced at the room temperature, but after reflow soldering or after storage, a sudden deterioration in capacitor characteristics was sometimes found to occur in these cases. In addition, too small amount of electrolyte sometimes leads to an unexpected drop in capacitor characteristics after reflow soldering.

In order to solve the aforementioned problems, heat treatment was once performed under conditions similar to those of a practical reflow soldering. By performing inspection on outer appearance and the capacitor characteristics (internal resistance and cell height), capacitors containing foreign matters incorporated in the production process or those containing excessive amount of electrolyte can be eliminated. A capacitor once subjected to a heat treatment does not suffer any explosion in the later reflow soldering. Similarly, it was found that the capacitor characteristics remain without being greatly affected by reflow soldering.

Preferably, the temperature profile with respect to time in the heat treatment step is set as close as the temperature profile with respect to time employed in the practical step of reflow soldering. To completely avoid the explosion of capacitor from occurring in the reflow soldering, the heat treatment is carried out at a higher temperature and at a longer time duration than those employed in reflow soldering. The heat treatment is preferably applied for one or more times. An increase in times of applying heat treatment increases the safety, however, the capacitor performance tends to be deteriorated by the heat. Hence, care must be made on applying repeated heat treatment.

Figure 2:
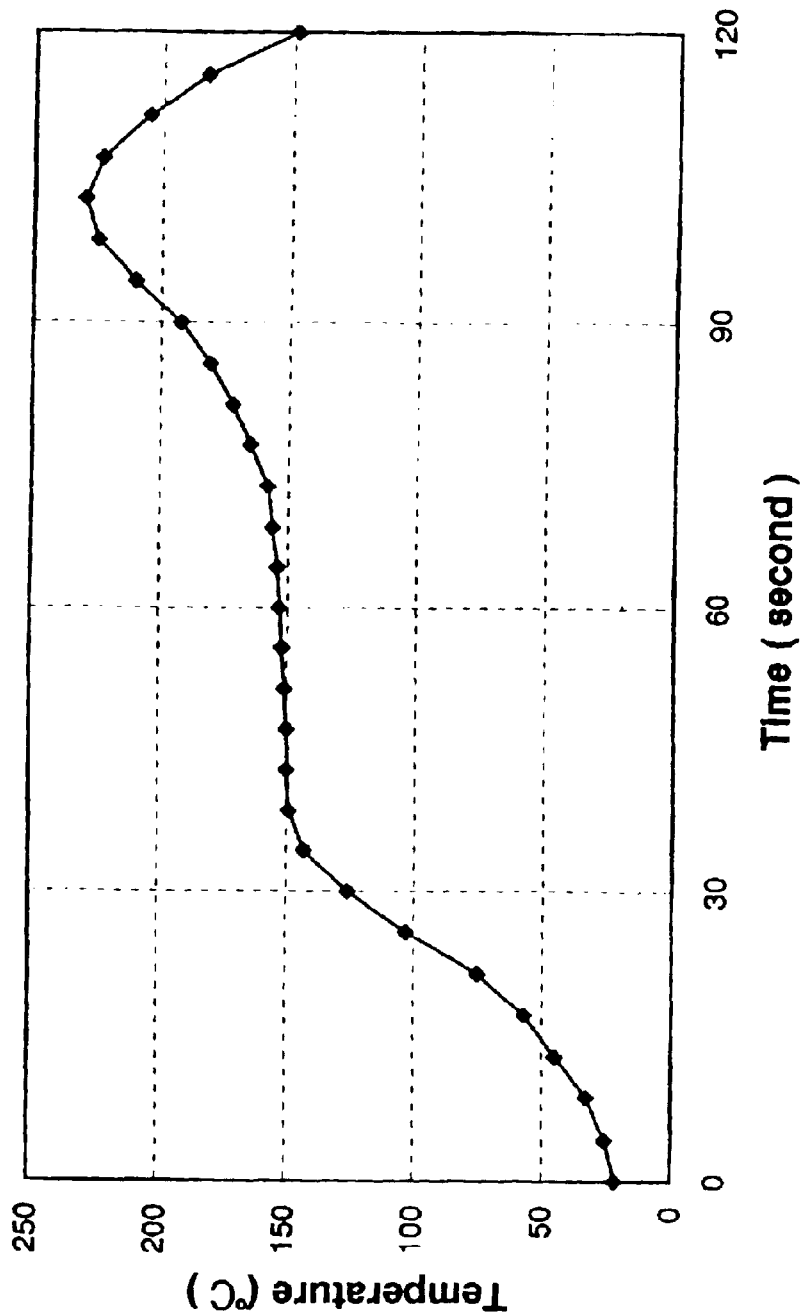
FIG. 2 is a temperature profile in the reflow soldering step, taken with respect to time.

In FIG. 2 is shown a temperature profile with respect to time in a common reflow soldering step. The temperature shown in the figure represents the temperature taken on the surface of the cell. The temperature profile with respect to time in the heat treatment step is preferably set as close to that of this profile. The difference in temperature between the temperature profile with respect to time in the heating step and the temperature profile with respect to time employed in mounting by reflow soldering may be somewhat large at the lower temperature region, but this discrepancy should be minimized at the high temperature region in the vicinity of the peak temperature. This is based on the fact that the cell is most influenced at the maximum temperature of the heat treatment step. If the maximum temperature should be low, the selection of anomalous capacitors becomes insufficient; if the temperature should be high, on the other hand, the capacitors become damaged. As a result of the experiments, sufficient effect was found obtainable by setting the difference in profiles, such that the time and temperature profiles should yield a difference within ±50% in a temperature region of from 0 to 150° C.; that the time and temperature profiles should yield a difference within ±20% in a temperature region of from 150 to 180° C.; and that the time and temperature profiles should yield a difference within ±10% in a temperature region of 180° C. or higher.

From the viewpoint of making confirmation on applying the heat treatment and on checking at the customer site, it is extremely effective to make some marking on the selected capacitors subjected to a heat treatment and passed through an inspection on the appearance and an investigation of the capacitor characteristics (internal resistance and cell height). For instance, marking can be made by printing the mark using an ink, or by using a laser marker.

A heat treatment performed after welding the terminal is still effective, however, some consideration should be made on, for instance, the adhesion to the vessel during heating, etc., in case a solder plated terminal is used. Furthermore, the capacitors that are found defective at the heat treatment performed after the welding become costly because such capacitors use more components and are subjected to more welding steps as compared to a capacitor that is found defective as it is before the heat treatment.

The other essential components of the coin-type electric double layer capacitor according to the present invention are constructed from materials having a heat resistance of at least 200° C.

The polarizable electrode for use in the electric double layer capacitor can be obtained from an active carbon powder obtained from sawdust, coconut shell, pitch, etc., which are subjected to activation treatment, and shaped together with a proper binder by means of press molding or rolling with rolls. Otherwise, an active carbon or an active carbon fiber can be prepared by rendering it infusible or by carbonizing and activating, for instance, a phenolic, a rayon, an acrylic, or a pitch-based fiber, and the like, which is then shaped into a felt, a fiber, a paper, or a sintering. Also usable are polyaniline (PAN) and polyacene. Preferred among them are those obtained by mixing an active carbon powder together with carbon black, which is used as the electrically conductive material, and a binder, i.e., polytetraethylene, and by shaping the resulting mixture.

As the electrolyte, the non-aqueous solvents generally utilized in the prior art electric double layer capacitors and non-aqueous secondary batteries can be used without any limitation. As the non-aqueous solvents, usable are the ring esters, chain esters, ring ethers, chain ethers, etc.; more specifically, preferably mentioned are non-aqueous solvents such as propylene carbonate (PC), ethylene carbonate (EC), butylene carbonate (BC), vinylene carbonate, dimethyl carbonate (DMC), diethyl carbonate (DEC), γ-butyrolactone (γBL), 2-methyl-γ-butyrolactone, acetyl-γ-butyrolactone, γ-valerolactone, 1,2-dimethoxyethane (DME), 1,2-ethoxyethane, diethyl ether, ethylene glycol dialkyl ether, diethylene glycol dialkyl ether, triethylene glycol dialkyl ether, tetraethylene glycol dialkyl ether, dipropyl carbonate, methylethyl carbonate, methylbutyl carbonate, methylpropyl carbonate, ethylbutyl carbonate, ethylpropyl carbonate, butylpropyl carbonate, an alkyl propionate ester, a dialkyl if malonate ester, an alkyl acetate ester, tetrahydrofuran (THF), an alkyltetrahydrofuran, a dialkyltetrahydrofuran, an alkoxytetrahydrofuran, a dialkoxytetrahydrofuran, 1,3-dioxolan, an alkyl-1,3-dioxolan, 2-methyltetrahydrofuran, dimethyl sulfoxide, 1,3-dioxolan, formamide, dimethylformamide, dioxolan, acetonitrile, nitromethane, methyl formate, methyl acetate, methyl propionate, ethyl propionate, triester phosphate, maleic anhydride, sulfolane, 3-methylsulfolane, etc., as well as the derivatives and mixtures thereof.

In case of using the electric double layer capacitor according to the present invention for use in reflow soldering, non-aqueous solvents having a boiling point of 200° C. or higher under the ordinary atmosphere can be stably used as the electrolyte. Hence, a non-aqueous solvent selected from propylene carbonate (PC), ethylene carbonate (EC), and γ-butyrolactone (γBL), which may be used either alone or in a composite, was found to yield favorable results.

As the principal impurities incorporated in the non-aqueous solvent above, mentioned are water and organic peroxides (e.g., glycols, alcohols, carboxylic acids, etc.). Those impurities presumably form an insulating film on the surface of the electrode to increase the interface resistance of the electrode. Hence, they may unfavorably influence to lower the cycle life and the capacity. Furthermore, they may increase self discharge during storage at high temperatures (at temperatures of 60° C. or higher). Accordingly, the impurities incorporated in the electrolytes containing a non-aqueous solvent are preferably as minimized as possible. More specifically, the water content should be reduced to 50 ppm or lower and the content of the organic peroxides should be reduced to 1000 ppm or lower.

As supporting salts, there may be used one or more types of salts selected from such as $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PPF_6$, $(C_2H_5)_4PCF_3SO_4$, $(C_2H_5)_4NPF_6$, lithium perchlorate ($LiClO_4$), lithium hexafluorophosphate ($LiPF_6$), lithium borofluoride ($LiBF_4$), lithium arsenohexafluoride ($LiAsF_6$), trifluorometasulfonate ($LiCF_3SO_3$) bis(trifluoromethylsulfonyl) imidolithium [$LiN(CF_3SO_2)_2$], thiocyanates, aluminum fluoride salts, and lithium salts, etc. Among them, those using aluminum salts were found favorable from the viewpoint of cycle characteristics and storage properties.

Furthermore, a polyethylene oxide derivative or a polymer containing said derivative, a polypropylene oxide derivative or a polymer containing said derivative, a phosphoric ester polymer, etc., can be used in combination with the supporting salts enumerated above.

The solid electrolyte comprising a polymer mixed with a supporting salt can be produced by solvent removal method and the like. The method comprises dissolving the polymer together with the supporting salt in acetonitrile, 1,2-dimethoxyethane, etc.; then coating a separator according to the present invention with the resulting solution; and drying the solution. Otherwise, there may be employed a method comprising dispersing polypyrrole in a solution containing dissolved therein PEO and a supporting salt, and then removing the solvent. In case of using a composite having a methacrylate skeleton (POE-PMMA), a mixture of the monomer and the supporting salt can be polymerized by heating or by irradiating light.

As the separator, there is used an insulating membrane having a predetermined mechanical strength and a high ion transmittance. Glass fibers are most stable in use for reflow soldering, however, there may also be used resins having a thermal deformation temperature of 230° C. or higher, such as polyphenylene sulfide, polyethylene terephthalate, polyamide, polyimide, etc. The pore size of the separator is in a range generally employed in capacitors. More specifically, usable are those having a pore size in a range of from 0.01 to 10 $\mu$m. The thickness of the separator is in a range generally employed in the capacitors; for instance, the thickness is in a range of from 5 to 300 $\mu$m.

For the gasket, commonly used are polypropylene and the like. However, in case of applying reflow soldering, resins having a thermal deformation temperature of 230° C. or higher, such as polyphenylene sulfide (PPS), polyethylene terephthalate, polyamide, liquid crystal polymers (LCP), tetrafluoroethylene-perfluoroalkyl vinyl ether copolymer resin (PFA), poly(ether ether ketone) region (PEEK), and polyether nitrile region (PEN), were found usable without causing explosion and the like at the reflow soldering temperature and without suffering any problem, such as a deformation of gaskets and the like, on storage after reflow soldering.

In addition to above, also usable are polyether ketone resin (PEK), polyarylate resin, polybutylene terephthalate resin, polycyclohexane dimethylene terephthalate resin, polyether sulfone resin, polyamino bismaleimide resin, polyether imide resin, and fluororesin. Furthermore, similar effects as described above were found achievable by using materials having added therein about 10% by weight or less of glass fibers, mica whiskers, fine ceramic powders, etc.

The gasket can be produced by methods such as injection molding, heat compression, etc. The injection molding method is most commonly employed in molding gaskets. However, in case of taking advantage of reduced cost at the sacrifice of molding precision, a liquid sealing agent is necessary to compensate for airtight sealing.

The heat compression method comprises applying heat compression molding to a starting molded product, i.e., a sheet material thicker than the desired thickness of the final molded product gasket, at a temperature not higher than the melting point of the material.

In general, when heat is applied to a thermoplastic resin molded by heat compression method at a temperature not higher than the melting point of the starting molded product, the molded product tends to recover its original shape. Hence, by using a gasket produced by this method in an electric double layer capacitor, a sufficient stress can be assured for sealing a space between the (resin) gasket and the outer canister and the (metal) canister; otherwise, a space would be formed between the (resin) gasket and the outer canister and the (metal) canister, or a sufficient stress for sealing such a space would not be attained. Furthermore, since such a gasket tends to recover its original shape of the molded product with passage of time, it is also effective for capacitors not subjected to reflow soldering.

In particular, gaskets manufactured by compression molding a tetrafluoroethylene-perfluoroalkyl vinyl ether copolymer resin (PFA) by applying heating and pressure to a sheet-like material yields superior sealing properties as compared to those manufactured by injection molding. This is attributed to the fact that PFA possesses rubber elasticity, and that, in contrast to an injection molded product which undergoes shrinking at the reflow temperature, a heat compressed product tends to recover the original sheet thickness at the reflow temperature. Hence, the inner pressure at the sealed inlet increases as to realize a higher airtight state.

In case of a coin- or button-type capacitor, one or a mixture selected from asphalt, a hydrocarbon rubber (e.g., butyl rubber, etc.), a fluorine based oil, a chlorosulfonated polyethylene, an epoxy resin, etc., which is optionally diluted with a solvent if necessary in facilitating the coating operation, is incorporated as a liquid sealing agent between the gasket and the positive and negative electrode canisters. In case the liquid sealing agent is transparent, it may be colored to make it distinguishable when coated. The sealing agent may be applied by injecting the sealing agent into the gasket, by coating on the positive and negative electrode canisters, by dipping the gasket into a solution of the sealing agent, etc.

It is effective to mix asphalt with the liquid sealing agents above. It is also effective to mix asphalt with a hydrocarbon rubber. A considerably high tight adhesion between the gasket and the cell casing can be achieved by applying heating on completing the assemblage of the capacitor. Although the reason for realizing such a tight adhesion is not completely clarified whether it is due to the increase in adhesiveness with heating or to the improvement of the adhesiveness of the hydrocarbon rubber itself that is mixed into asphalt, the cell case and the gasket can be more tightly adhered to considerably improve the storage properties and the resistance against leakage.

In case of an electric double layer capacitor mountable by reflow soldering, hard engineering plastics is used as the gasket. Hence, an electric double layer capacitor mountable by reflow soldering is generally inferior to an electric double layer capacitor using no reflow soldering in the air tightness at the sealing inlet, and tends to yield poor storage properties and resistance against leakage. Accordingly, if a cell is assembled by using a sealing agent containing asphalt and is shipped after heating, the storage properties and the resistance against leakage can be considerably improved until the cell is embedded into an equipment by means of reflow soldering. As a matter of course, the storage properties and the resistance against leakage are also maintained after the reflow soldering.

As the asphalt, usable are straight asphalt and blown asphalt obtained by oxidation polymerization of straight asphalt. In particular, blown asphalt containing asphaltene at a large quantity and having excellent adhesiveness was found effective. An addition of 2% by weight or more of asphalt with respect to the main component of the sealing agent was found effective.

The heating temperature can be selected from temperatures not lower than the point at which the liquid sealing agent containing mixed therein the asphalt undergoes softening. In case straight asphalt is mixed, a temperature of 80° C. or higher is preferred; whereas in case blown asphalt is mixed, a temperature of 100° C. or higher is preferred. It is effective to perform the heating in the heating step according to the invention of the present application, in which the step is once carried out under conditions similar to those employed in practical reflow soldering.

It is also possible to fix the polarizable electrode and the collector by using an electrically conductive adhesive. As such an electrically conductive adhesive, usable are those based on a resin dissolved in a solvent and having added therein a powder or fibers of carbon or metal, or having dissolved therein an electrically conductive polymer.

As the electrode terminals, mainly usable are those made of metal, i.e., a processed sheet-like stainless steel about 0.1 to 0.3 mm in size. Gold plating, nickel plating, solder plating, etc., are generally applied to the portion of the terminal that is soldered to the circuit substrate. In case of welding the terminals to the cell, usable are resistance welding method, laser welding method, etc.

The capacitor according to the present invention is assembled in a moisture-free atmosphere or in an inert gas atmosphere. Furthermore, it is preferred that the components to be assembled are dried prior to the assemblage. Methods for drying or dehydration generally employed in the art may be applied to the pellets, sheets, and other components. For the drying or dehydration, particularly preferred is to use hot air, vacuum evacuation, infrared radiation, far infrared radiation, electron beam, or low moisture air, either alone or in combination thereof. The temperature range usable in this case is preferably from 80 to 350° C., and particularly, from 100 to 250° C. From the viewpoint of improving charge and discharge cycle characteristics, the water content of the entire cell is preferably reduced to 2000 ppm or lower, and for the polarizable electrodes and electrolytes, the water content is preferably reduced to 500 ppm or lower.

The present invention is described in further detail below by making reference to Examples.

EXAMPLES

Example 1

FIG. 1 shows a cross section view of a coin-type electric double layer capacitor. Referring to FIG. 1, main constituents are a positive electrode canister 101, an electrically conductive adhesive material 102, a positive electrode case or molding 103 for the polarizable electrode, a negative electrode canister 104, an electrically conductive adhesive material 106, a negative electrode case or molding 105 for the polarizable electrode, an electrolyte 109, a separator 108, and a gasket 107. The gasket 107 was made of PPS. The polarizable electrode was prepared by mixing 80% by weight of active carbon, 10% by weight of an electrically conductive material, i.e., carbon black, and 10% by weight of ethylene tetrafluoride binder, which was rolled to obtain a sheet thereof. The molding 103 for the positive electrode was 0.5 mm in thickness and 2.0 mm in diameter. The molding 105 for the negative electrode was 0.5 mm in thickness and 2.0 mm in diameter. The moldings 103 and 105 for the positive and the negative electrodes were each adhered with the positive electrode canister 101 and the negative electrode canister 104, respectively, by using the electrically conductive adhesive materials 102 and 106.

After adhering the moldings with the canisters, the units of positive electrode and negative electrode were thermally treated at a temperature of 150° C. under a vacuum of $10^{-2}$ Torr or lower, respectively.

The electric double layer capacitor was manufactured in a dry room the dew point of which was controlled to −40° C. or lower. After inserting the gasket 107 into the negative electrode canister 104, a glass fiber separator 108 was mounted on the negative electrode, and, after injecting the organic electrolyte 109, the positive electrode canister 101 was caulked for sealing. The organic electrolyte 109 was obtained by dissolving a tetrafluoroborate salt of tetraalklammonium as the solute in a propylene carbonate (abbreviated as "PC") solvent having a boiling point of about 240° C.

Then, 3000 units of capacitors were heated in a reflow furnace of a hot air heating type. The heating profile was the same as that shown in FIG. 2.

As a result, it was found that 0 capacitors caused explosion, and that 259 capacitors caused leakage. Furthermore, on measuring the capacitor characteristics, 12 capacitors were found to increase their height, and 126 capacitors were found to show an increase in internal resistance by 10% or more.

Then, laser welding of the positive electrode terminal 111 and negative electrode terminal 112 was performed on the capacitors free from defects, and reflow soldering was further applied to the substrate by using the same profile as that shown in FIG. 2.

To the capacitors soldered to the substrate, inspections were made on the appearance and the capacitor characteristics. As a result, it was found that no capacitors showing anomalies were present.

Examples 2 to 43

FIG. 1 shows a cross section view of a coin-type electric double layer capacitor. Referring to FIG. 1, main constituents are a positive electrode canister 101, an electrically conductive adhesive material 102, a positive electrode case or molding 103 for the polarizable electrode , a negative electrode canister 104, an electrically conductive adhesive material 106, a negative electrode case or molding 105 for the polarizable electrode, an electrolyte 109, a separator 108, and a gasket 107. The materials used for the gasket 107 are shown in Table 1. The polarizable electrode was prepared by mixing 80% by weight of active carbon, 10% by weight of an electrically conductive material, i.e., carbon black, and 10% by weight of ethylene tetrafluoride binder, which was rolled to obtain a sheet thereof. The molding 103 for the positive electrode was 0.5 mm in thickness and 2.0 mm in diameter. The molding 105 for the negative electrode was 0.5 mm in thickness and 2.0 mm in diameter. The moldings 103 and 105 for the positive and the negative electrodes were each adhered with the positive electrode canister 101 and the negative electrode canister 104, respectively, by using the electrically conductive adhesive materials 102 and 106. After adhering the moldings with the canisters, the units of positive electrode and negative electrode were thermally treated at a temperature of 150° C. under a vacuum of $10^{-2}$ Torr or lower, respectively.

The liquid sealing agent 110 to be applied to the positive electrode canister was produced by dissolving a commercially available butyl rubber adhesive (containing 30% by weight of butyl rubber and balance toluene) together with blown asphalt in toluene. The liquid sealing agent thus obtained was applied to the inner side of the positive electrode canister by using an injector, and was dried at 120° C. in a dry room. The composition of the sealing agent is shown in Table 1.

The liquid sealing agent to be applied to the gasket was produced by dissolving a commercially available butyl rubber adhesive (containing 30% by weight of butyl rubber and balance toluene) together with blown asphalt in toluene. The liquid sealing agent thus obtained was applied to the groove of the gasket by using an injector, and was dried at 120° C. in a dry room. The composition of the sealing agent is shown in Table 1.

The electric double layer capacitor was manufactured in a dry room the dew point of which was controlled to −40° C. or lower. After inserting the gasket 107 into the negative electrode canister 104, a glass fiber separator 108 was mounted on the negative electrode, and, after injecting the organic electrolyte 109, the positive electrode canister 101 was caulked for sealing. The organic electrolyte 109 was obtained by dissolving a tetrafluoroborate salt of tetraalkylammonium as the solute in a propylene carbonate (abbreviated as "PC") solvent having a boiling point of about 240° C.

Then, 500 units of capacitors were heated in a reflow furnace of a hot air heating type. The heating profile was the same as that shown in FIG. 2.

A voltage of 2.5 V was applied to the capacitors thus obtained, and after storing them at 60° C. for 20 days, they were maintained for 1 hour or longer in a short circuit state. The capacitors were charged at 2.5 V for 30 minutes with a protective resistance of 100 Ω being inserted, and were then discharged at 100 µA to measure the capacity in the range of from 1.5 to 2.0 V. As a comparative example 1, 500 units of capacitors using a liquid sealing agent free from asphalt were prepared. The results are shown in Table 1.

TABLE 1

| | Gasket Material | Liquid sealing agent for positive and negative electrodes | | Leakage /units | Capacity after storage/F. |
|---|---|---|---|---|---|
| | | Asphalt | Asphalt to butyl rubber ratio/wt % | | |
| Comp. Example 1 | PPS | Straight | 0 | 8 | 0.04 |
| Example 2 | PPS | Straight | 1 | 5 | 0.05 |
| Example 3 | PPS | Straight | 2 | 0 | 0.06 |
| Example 4 | PPS | Straight | 10 | 0 | 0.06 |
| Example 5 | PPS | Straight | 20 | 0 | 0.06 |
| Example 6 | PPS | Straight | 30 | 0 | 0.06 |
| Example 7 | PPS | Straight | 40 | 0 | 0.06 |
| Example 8 | PPS | Straight | 50 | 0 | 0.06 |
| Example 9 | PPS | Blown | 1 | 3 | 0.05 |
| Example 10 | PPS | Blown | 2 | 0 | 0.06 |
| Example 11 | PPS | Blown | 10 | 0 | 0.06 |
| Example 12 | PPS | Blown | 20 | 0 | 0.06 |
| Example 13 | PPS | Blown | 30 | 0 | 0.06 |
| Example 14 | PPS | Blown | 40 | 0 | 0.06 |
| Example 15 | PPS | Blown | 50 | 0 | 0.06 |
| Example 16 | PEEK | Straight | 1 | 4 | 0.05 |
| Example 17 | PEEK | Straight | 2 | 0 | 0.06 |
| Example 18 | PEEK | Straight | 10 | 0 | 0.06 |
| Example 19 | PEEK | Straight | 20 | 0 | 0.06 |
| Example 20 | PEEK | Straight | 30 | 0 | 0.06 |
| Example 21 | PEEK | Straight | 40 | 0 | 0.06 |
| Example 22 | PEEK | Straight | 50 | 0 | 0.06 |
| Example 23 | PEEK | Blown | 1 | 2 | 0.05 |
| Example 24 | PEEK | Blown | 2 | 0 | 0.06 |
| Example 25 | PEEK | Blown | 10 | 0 | 0.06 |
| Example 26 | PEEK | Blown | 20 | 0 | 0.06 |
| Example 27 | PEEK | Blown | 30 | 0 | 0.06 |

TABLE 1-continued

| | Gasket Material | Liquid sealing agent for positive and negative electrodes | | Leakage /units | Capacity after storage/F. |
|---|---|---|---|---|---|
| | | Asphalt | Asphalt to butyl rubber ratio/wt % | | |
| Example 28 | PEEK | Blown | 40 | 0 | 0.06 |
| Example 29 | PEEK | Blown | 50 | 0 | 0.06 |
| Example 30 | LCP | Straight | 1 | 7 | 0.05 |
| Example 31 | LCP | Straight | 2 | 2 | 0.06 |
| Example 32 | LCP | Straight | 10 | 0 | 0.06 |
| Example 33 | LCP | Straight | 20 | 0 | 0.06 |
| Example 34 | LCP | Straight | 30 | 0 | 0.06 |
| Example 35 | LCP | Straight | 40 | 0 | 0.06 |
| Example 36 | LCP | Straight | 50 | 0 | 0.06 |
| Example 37 | LCP | Blown | 1 | 5 | 0.05 |
| Example 38 | LCP | Blown | 2 | 1 | 0.05 |
| Example 39 | LCP | Blown | 10 | 0 | 0.06 |
| Example 40 | LCP | Blown | 20 | 0 | 0.06 |
| Example 41 | LCP | Blown | 30 | 0 | 0.06 |
| Example 42 | LCP | Blown | 40 | 0 | 0.06 |
| Example 43 | LCP | Blown | 50 | 0 | 0.06 |

In the capacitors obtained as comparative example 1 having no asphalt added therein, 8 units were found to cause liquid leakage on heating. The capacity was found to decrease after storage. Similarly, the capacitors prepared by adding 1% by weight of asphalt were found to cause liquid leakage. In the capacitors prepared by adding 1% by weight of asphalt, the number of units that have caused leakage is less for those obtained in Example 9 as compared to those obtained in Example 2. Hence, it can be presumed that a small addition of blown asphalt is more effective. Capacitors obtained by adding 2% by weight or more of asphalt were found to be free of leakage and of deterioration in capacity after storage.

A favorable capacitor performance is obtained in case 50% by weight or more of asphalt is added to the butyl rubber that is used as the butyl rubber adhesive. However, those products may lower productivity due to the sticking of the liquid sealing agent that had leaked out during the production of the capacitor.

By applying heating according to a method of the present invention to coin-type (button-type) electric double layer capacitors mountable by reflow soldering, it was found to overcome the problem of causing bulging or leakage (i.e., leaking of the electrolyte to the outside of the capacitor), or in worst case, causing explosion during the reflow soldering utilized in mounting the capacitor to the product substrate due to a fluctuation in the production process. Thus, by shipping capacitors subjected to heating in accordance to the present invention, the problem of causing bulging or leakage on the reflow process at the customer side could be eliminated.

Furthermore, by adding asphalt to the liquid sealing agent, the sealing properties after heating was improved to considerably improve the storage properties and the resistance properties against leakage.

While the invention has been described in detail above, it would be apparent to those skilled in the art that various modifications and changes can be made without departing from the spirit and the scope of the present invention.

[FIG. 1]
101 Positive electrode canister
102 Electrically conductive adhesive
103 Positive electrode molding 104 Negative electrode canister
105 Electrically conductive adhesive
106 Negative electrode formed molding
107 Gasket
108 Separator
109 Electrolyte
110 Liquid sealing agent
111 Positive electrode terminal
112 Negative electrode terminal

What is claimed is:

1. A method for producing an electrical double layer capacitor, comprising the steps of:

assembling together components comprised of a positive electrode, a negative electrode, a non-aqueous solvent, an electrolyte containing a supporting salt, a separator, and a gasket to form a coin- or button-type electrical double layer capacitor;

heating the assembled coin- or button-type electrical double layer capacitor so that a temperature profile of the heating step is approximately the same as a temperature profile of reflow soldering; and welding an outer connection terminal to the heated assembled coin- or button-type electrical double layer capacitor.

2. A method for producing an electrical double layer capacitor as claimed in claim 1; wherein the heating step comprises heating the assembled coin- or button-type electrical double layer capacitor at a temperature in a range of 180 to 300° C.

3. A method according to claim 1; wherein the assembling step comprises assembling together the components by caulk sealing the components.

4. A method of mounting an electrical double layer capacitor on a circuit substrate, comprising the steps of:

providing a circuit substrate;

assembling together components comprised of a positive electrode, a negative electrode, a non-aqueous solvent, an electrolyte containing a supporting salt, a separator, and a gasket to form a coin- or button-type electrical double layer capacitor;

heating the assembled coin- or button-type electrical double layer capacitor;

welding an outer connection terminal to the heated assembled coin- or button-type electrical double layer capacitor;

arranging the heated assembled coin- or button-type electrical double layer capacitor on the circuit substrate; and reflow soldering the heated assembled coin- or button-type electrical double layer capacitor on the circuit substrate using the outer connection terminal, a temperature profile of the reflow soldering step being approximately the same as a temperature profile of the heating step.

5. A method according to claim 4; wherein the assembling step comprises assembling together the components by caulk sealing the components.

6. A method for producing an electrical double layer capacitor, comprising the steps of: assembling together components comprised of a positive electrode, a negative electrode, a non-aqueous solvent, an electrolyte containing a supporting salt, a separator, and a gasket to form a coin- or button-type electrical double layer capacitor containing a foreign substance; heating the assembled coin- or button-type electrical double layer capacitor to remove at least a substantial amount of the foreign substance contained in the assembled coin- or button-type electrical double layer capacitor, a temperature profile of the heating step being approximately the same as a temperature profile of reflow soldering; and welding a connection terminal to the heated assembled coin- or button-type electrical double layer capacitor.

7. A method according to claim 6; wherein the assembling step comprises assembling together the components by caulk sealing the components.

8. A method according to claim 6; wherein the heating step comprises heating the assembled electrical double layer capacitor at a temperature in a range of 180 to 300° C.

9. A method according to claim 6; further comprising the step of marking the heated assembled electrical double layer capacitor to distinguish the heated assembled electrical double layer capacitor from an assembled electrical double layer capacitor which has not been heated.

10. A method of mounting an electrical double layer capacitor on a circuit substrate, comprising the steps of: providing a circuit substrate; assembling together components comprised of a positive electrode, a negative electrode, a non-aqueous solvent, an electrolyte containing a supporting salt, a separator, and a gasket to form a coin- or button-type an electrical double layer capacitor containing a foreign substance; heating the assembled coin- or button-type electrical double layer capacitor to remove at least a substantial amount of the foreign substance contained in the assembled coin- or button-type electrical double layer capacitor; welding a connection terminal to the heated assembled coin- or button-type electrical double layer capacitor; arranging the heated assembled coin- or button-type electrical double layer capacitor on the circuit substrate using the welded connection terminal; and reflow soldering the coin- or button-type heated assembled electrical double layer capacitor on the circuit substrate, a temperature profile of the reflow soldering step being approximately the same as a temperature profile of the heating step.

11. A method according to claim 10; wherein the assembling step comprises assembling together the components by caulk sealing the components.

12. A method according to claim 10; wherein the heating step comprises heating the assembled electrical double layer capacitor at a temperature in a range of 180 to 300° C.

13. A method according to claim 10; further comprising the step of marking the heated assembled electrical double layer capacitor to distinguish the heated assembled electrical double layer capacitor from an assembled electrical double layer capacitor which has not been heated.

* * * * *